United States Patent [19]

Choi

[11] Patent Number: 5,481,263
[45] Date of Patent: Jan. 2, 1996

[54] COMPUTER WITH SEPARATE LEFT HAND AND RIGHT HAND OPERATED KEYBOARD UNITS

[76] Inventor: Man S. Choi, c/o 63 Primrose La., Closter, N.J. 07624

[21] Appl. No.: 800,469

[22] Filed: Nov. 29, 1991

Related U.S. Application Data

[63] Continuation-in-part of Ser. No. 487,182, Mar. 1, 1990, abandoned.

[51] Int. Cl.⁶ ................................................ H01H 13/70
[52] U.S. Cl. ....................... 341/20; 400/486; 400/488; 400/489; 400/492
[58] Field of Search ........................... 341/20, 21, 22; 400/486, 488, 489, 492, 680, 88; 364/708

[56] References Cited

U.S. PATENT DOCUMENTS

| Re. 32,977 | 7/1989 | Gotoh et al. | 200/5 A |
|---|---|---|---|
| 3,940,758 | 2/1976 | Margolin | 364/708 X |
| 4,244,659 | 1/1981 | Malt | 400/486 |
| 4,522,518 | 6/1985 | Schmidt | 400/489 X |
| 4,913,573 | 4/1990 | Retter | 400/489 |
| 4,971,465 | 11/1990 | Hashimoto | 400/489 X |

FOREIGN PATENT DOCUMENTS

| 8902369 | 3/1989 | WIPO | 400/489 |

OTHER PUBLICATIONS

Pechanels et al; Briefcase–Portable Textwriter with 100–key full–size keyboard; IBM Technical Disclosure Bulletin; vol. 27, No. 4A; Sep. 1984 pp. 2002–2004.

*Primary Examiner*—Michael Horabik
*Attorney, Agent, or Firm*—Robert W. J. Usher

[57] ABSTRACT

A keyboard for an electronic processor comprises two separate keyboard units for operation by the left and right hands, respectively, having keys at locations corresponding to those of the left hand operated and right hand operated sides of a conventional, touch-typing keyboard. In one example, the keyboard units can be folded for packing in stacked relation for pocketability. In another example, the keypads are concave with the keys extending along an arc of travel of the user's fingers and a palm supporting handrest is located adjacent the keypad. Both the keys and the handrest are adjustable to accommodate hands of different sizes.

5 Claims, 6 Drawing Sheets

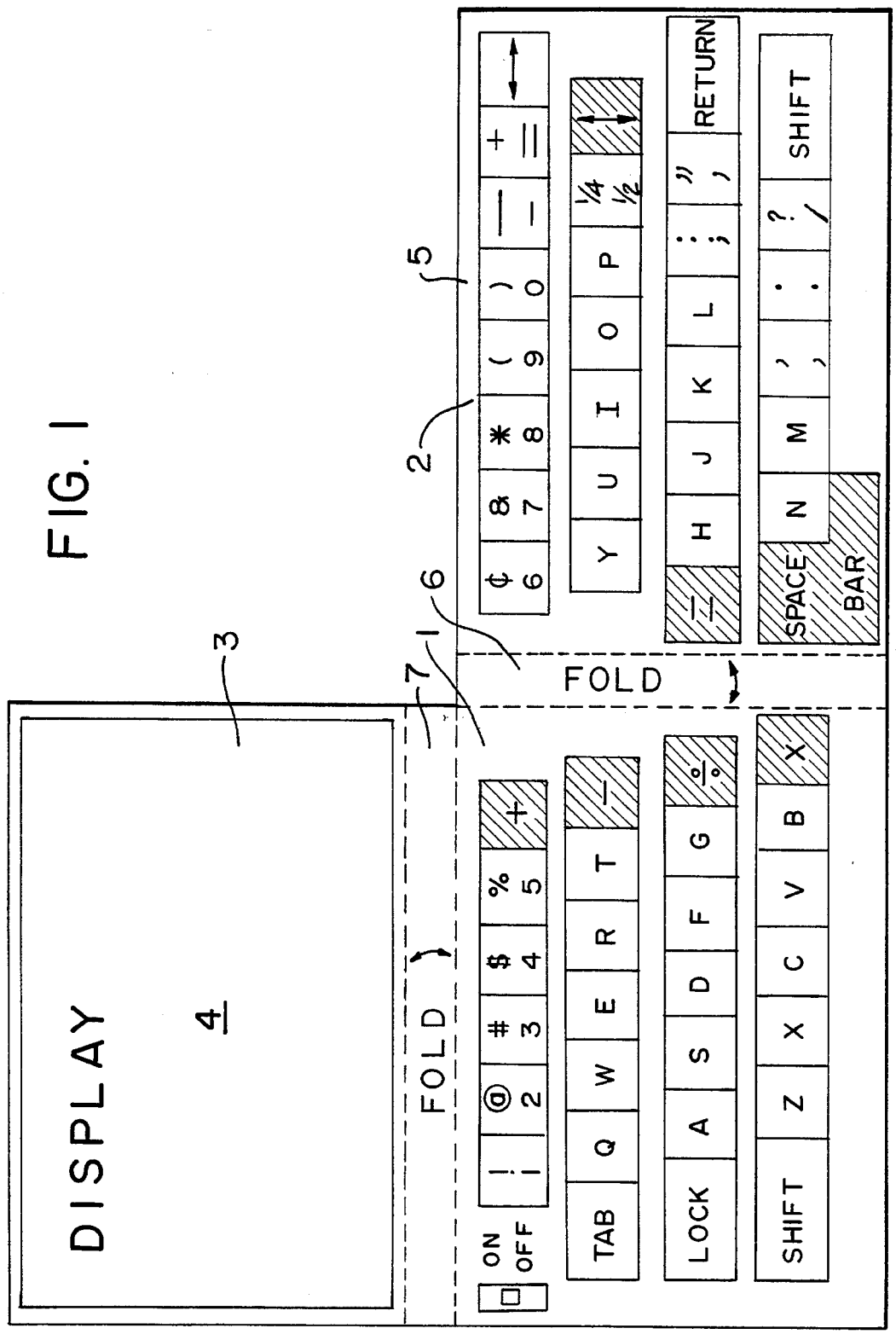

COMPUTER WITH SEPARATE LEFT HAND AND RIGHT HAND OPERATED KEYBOARD UNITS

This is a continuation-in-part application of Ser. No. 07/487,182 filed Mar. 1, 1990 now abandoned.

FIELD OF THE INVENTION

The invention relates to computers having separate left hand and right hand operated keyboard units.

BACKGROUND OF THE INVENTION

A well-known problem for typists is the physical stress and strain arising from the need for the typist to adopt a relatively stationary, usually erect and rigid posture when touch-typing. Such strain may be experienced over essentially the entire physique including, more commonly the fingers, wrists, arms, shoulders, neck and back, essentially the entire upper torso of the individual typing. Such stress and strain accelerates fatigue, increasing errors and slowing the entire typing process. Furthermore, actual injury may result, requiring time off work.

This problem has increased with the adoption of personal computers where much information is input directly from the keyboard.

Further problems arise with the inexorable trend to miniaturization resulting in powerful pocket sized processors. Such miniaturization however, produces further difficulties of design in that the individual keys must be sufficiently spaced apart to enable operation by both hands without risk of inadvertent depression of adjacent keys. At the same time, the use of a conventional touch typing technique should be accommodated for efficient input of information. Students, executive, reporters and others are increasingly desirous of taking notes at lectures and other meetings by direct input on a keyboard when touch-typing is essential to maintain the necessary speed to keep pace with the proceedings.

It is acknowledged as known to provide a keyboard designed to be operated by only one hand by substantially reducing the number of keys thereon. However, a conventional touch typing is not therefore possible.

U.S. Pat. No. Re 32,977 to Goton, issued Jul. 4, 1989 discloses a keyboard structure curved about a single transverse axis to improve to improve key accessibility. However, no adjustment of inter-key spacing is permitted, operation by a single hand is not intended and support of the hand during typing is not taught.

OBJECTS OF THE INVENTION

It is an object of the invention to provide a keyboard which will accommodate variations in a typist's posture while still enabling efficient input of information using conventional touch typing techniques.

It is another object of the invention to provide a keyboard comprising separate keyboard units to accommodate changes in position of the user and operable, respectively, by the left hand and right hand of the user.

A further object of the invention is to provide a keyboard comprising separate keyboard units which may be packed in stacked condition, one on top of the other by folding together for incorporation in a miniature or pocketable computer assembly but which, when unfolded, affords sufficient spacing to enable operation by conventional touch-typing techniques.

It is a further object of the invention to provide a keyboard unit adjustable to accommodate hands of different sizes.

SUMMARY OF THE INVENTION

According to one aspect of the invention, there is provided a pocket computer comprising a housing having three rigid, generally flat, rectangular panel shaped housing parts of equal size having, respectively, pairs of opposite major and minor sides, a first and a second housing part carrying respectively, sets of keys arranged in conformity with a conventional left hand and right hand operated side of a conventional keyboard and the third panel carrying a display screen, the first and second housing parts being hingedly joined together transversely of the rows of keys along their adjacent first and second minor sides, respectively, and the third housing panel part being hingedly joined to one of the first and second housing parts along adjacent respective major sides thereof with electrical connection maintained between the display panel, the keys of the first and second housing parts and the computer processor whereby the computer is collapsible to pocket size by folding about the respective hinges to bring the respective housing parts overlying in face-to-face stacked relation thereby to provide a compact, pocket sized structure.

It will be appreciated that the individual housing parts may be formed as rigid, essentially self-contained structures incorporating the necessary elements for operation of the display panel and keyboards respectively while the necessary electrical connections between the respective housing parts may be effected by using a ribbon cable or flexible circuitry of known type.

It is preferred that an on/off switch be carried on the first keyboard panel and that the display screen panel is hingedly connected to the major side of the first housing part so that the second housing part and the display panel can be folded to overlie the first panel when the computer is folded to pocket condition.

In a preferred arrangement, the keys are arranged as four rows, the numerical keys being in the first row and calculator function keys: "plus", "minus", "divide" and "multiply" being arranged as the endmost keys adjacent the hinge of respective key rows of one hand with the "equal" sign arranged as the endmost key adjacent the hinge of one row of the other hand.

It is further preferred that the space bar is located on the keyboard of the other hand in an endmost position adjacent the hinge in a row below the "equal" sign and the space bar is of extended width, preferably, of generally "L" shape.

According to a further aspect of the invention, a pair of keyboard units each comprises a housing frame carrying a key pad with sets of keys serially arranged, respectively, in conformity with conventional left hand or right hand operated sides of a conventional touch typing keyboard and handrests, means being provided on the housing frame supporting the sets of keys in a preferably, concave array extending in front of and at a lower level than the hand rests.

The provision of the handrest in conjunction with the dished or concave keypad enables the typist to rest the hand keeping it substantially stationary throughout typing as the keys are located on an arc through which the finger tips can sweep, enabling the fingers to reach all keys, although the palm remains essentially stationary being supported by the hand rest. This enables much arm, wrist, shoulder and neck strain to be ameliorate or obviated completely, while the ability to separate the individual keyboard units, placing them in any suitable position enables the user to adopt the most relaxed position, possibly even with a unit on each side or at different levels and change such position when experiencing the first hint of fatigue further obviating strain.

In addition, the proximity of each key to the finger, substantially equidistant therefrom, enhances the potential typing speed.

Preferably, means are provided on the housing frame mounting the keys on the keypad for adjustment in a radial direction to and away from a typists finger. Desirably, means are also provided on the housing frame mounting the keys on the keypad for adjustment of their transverse positions relative to a typist's finger. Means are also provided on each housing frame mounting the handrest for adjustment towards and away from the keypad.

These features of adjustment enable the keyboard unit to be matched precisely to different hand sizes increasing the potential speed of typing and further reducing risk of stress and fatigue.

BRIEF DESCRIPTION OF THE DRAWINGS

Specific embodiments of the invention will now be described by way of example only and with reference to the accompanying drawings in which:

FIG. 1 is a schematic plan view of a preferred embodiment of a pocket computer according to the invention;

FIG. 4 is a schematic fragmentary view of the adjustable mounting mechanism for the keys of the keyboard unit of FIG. 2a;

DETAILED DESCRIPTION OF THE INVENTION

Figure 2A:
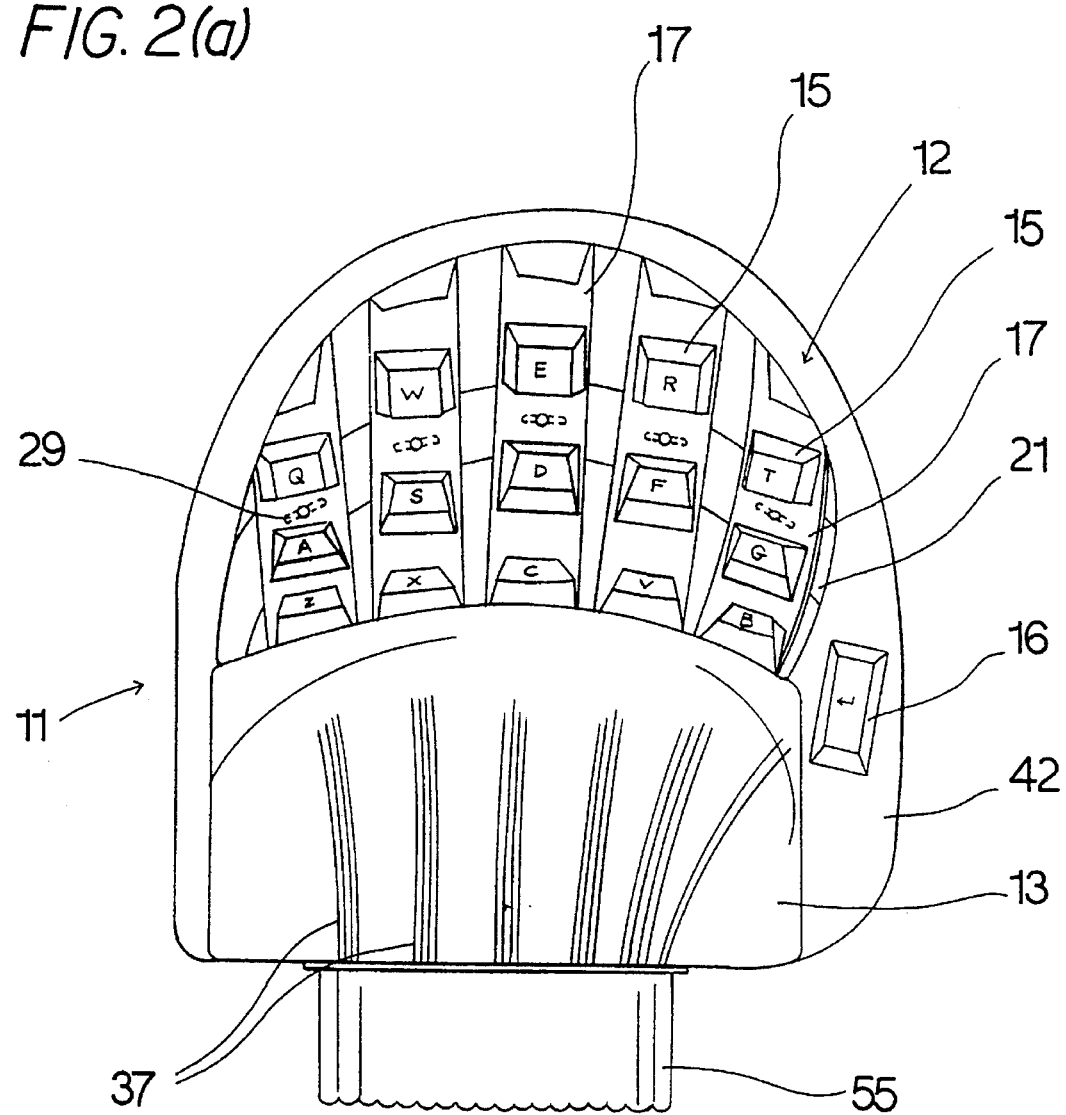
FIG. 2(a) is a plan view of a second embodiment of a keyboard unit for operation by the left hand.

As show in FIG. 1 the pocket computer comprises a housing consisting of first and second housing portions 1 and 2 formed as rectangular panel-like structures and carrying respectively the keys arranged as a conventional keyboard as shown and a third housing 3 of similar size carrying a display screen 4.

The three housing frames are each formed as sufficiently rigid structures to protect and support a conventional microprocessor and associated circuitry, the display screen and the individual keys. The individual housing frames may be manufactured in conventional manner from stamped and formed metal parts and mounted within a sheath 5 of plastics material defining first and second flexible web hinges 6 and 7, respectively, extending transversely of the rows of keys along adjacent minor sides of the first and second keyboard carrying housing portions 1 and 2, respectively, and between a major side of the first housing and a major side of the third housing, defining hinge axis whereby the second and third housings may be folded to overlie the first housing to compact the computer to pocket-size.

It will be appreciated that the necessary flexible circuitry or ribbon cable extends between the individual housings across the web concealed in the plastic sheath interconnecting electrically the housings as necessary. The keys on the first and second housings are arranged in rows corresponding to the keys on a conventional QWERTY keyboard with the left hand operated keys all being located in the first, lefthand housing and the right hand keys all being located in the second, righthand housing. As shown, the number keys occupy the first, uppermost row to the left of which, in the first housing, is located the on/off switch. The calculating keys "plus", "minus", "divide" and "multiply" are located as endmost keys in respective rows of the first housing adjacent the first hinge 6 and the "equal" key is located as an endmost key adjacent the hinge in the third row of the right housing. The space bar is of extended size being generally "L" shape and located as the endmost key adjacent the hinge in the fourth row of the right housing.

It will be readily understood that the embodiment described above can be manufactured entirely by conventional techniques which are part of the stock of knowledge of the technician skilled in the construction of pocket calculators.

The second and third panels can easily be folded to overlie the first panel to provide a three layered flat, rectangular structure of sufficiently small thickness to be carried completely concealed in a user's pocket but which, when unfolded will provide a keyboard having the left and right hand keys as well as the individual keys sufficiently well spaced to enable operation with both hands simultaneously using a conventional touch typing technique thereby affording the advantages both of extreme compactness and portability and enhanced efficiency of use.

In the second example, shown in FIGS. 2(a), and 3–6, a left hand operated keyboard unit 11 comprises a keypad 12 and a handrest 13 respectively contained and supported by a housing casing 14.

The keypad 12 is formed as a substantially concave bowl curved about orthogonal axes, semi-circular or crescent shaped in plan including individual keys 15 arrayed as five longitudinally extending rows in spaced apart, relative mounted on upper faces of respective arcuate strip-like metal carriers 17 themselves mounted for limited pivotal lateral movement on upper rear, lower medial and upper front arcuate metal ribs 20, 21, and 22, respectively, joined together a longitudinal ends by welding. The carriers 17 have pivot pins 18 extending from respective opposite ends pivotally located in respective apertures 25 and 26 formed at spaced apart locations along the rear and front ribs 20 and 22, respectively, and a threaded medial portion 27 receiving a clamping screw 28 extending through slots 29 formed at spaced apart locations along the lower rib 21 clamping the strip for pivotal adjustment of lateral position on the keypad. It will be appreciated that, as a result of the curvature, the keys located around the entire periphery (both lateral and longitudinal) of the keypad will be at a higher level than the more centrally located keys, while the row of laterally endmost keys operated by the index finger are tilted inwardly as a result of such curvature.

Figure 3:
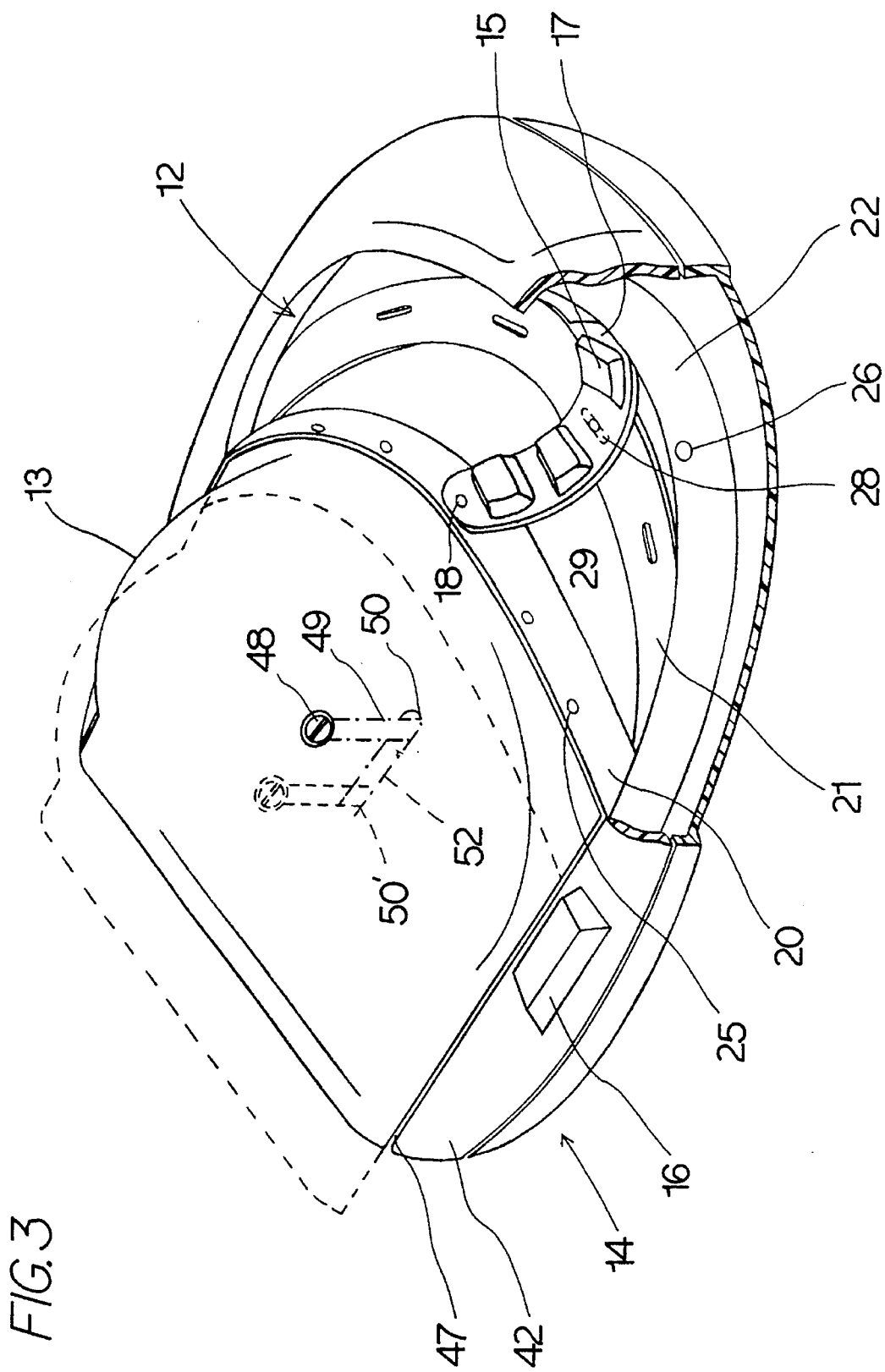
FIG. 3 is a perspective view of the keyboard unit of FIG. 2a, partly cut away to show the keypad structure.
Figure 5:
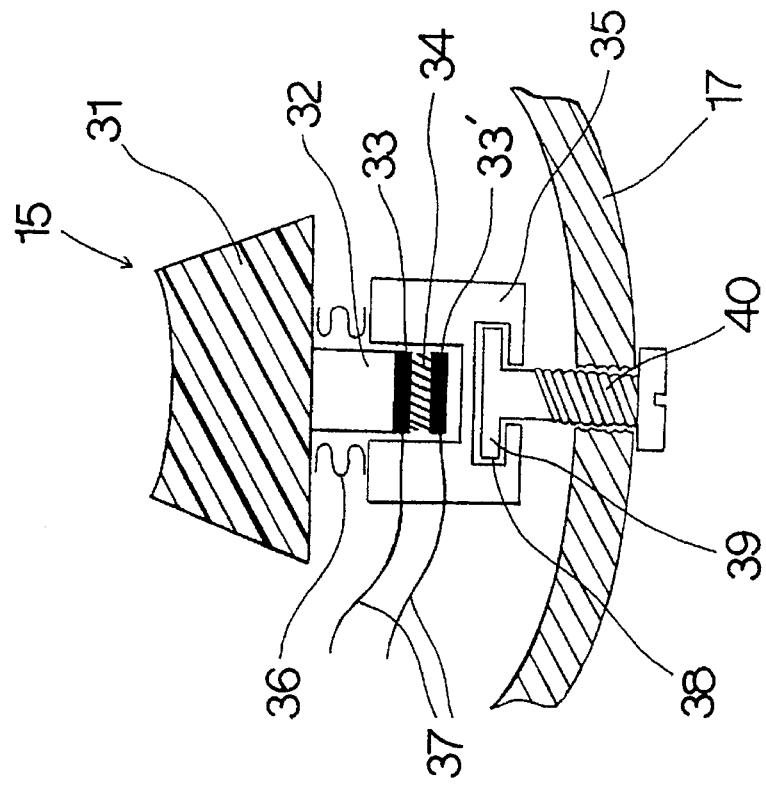
FIG. 5 is a schematic cross-sectional view of an individual key unit assembly.
Figure 4:
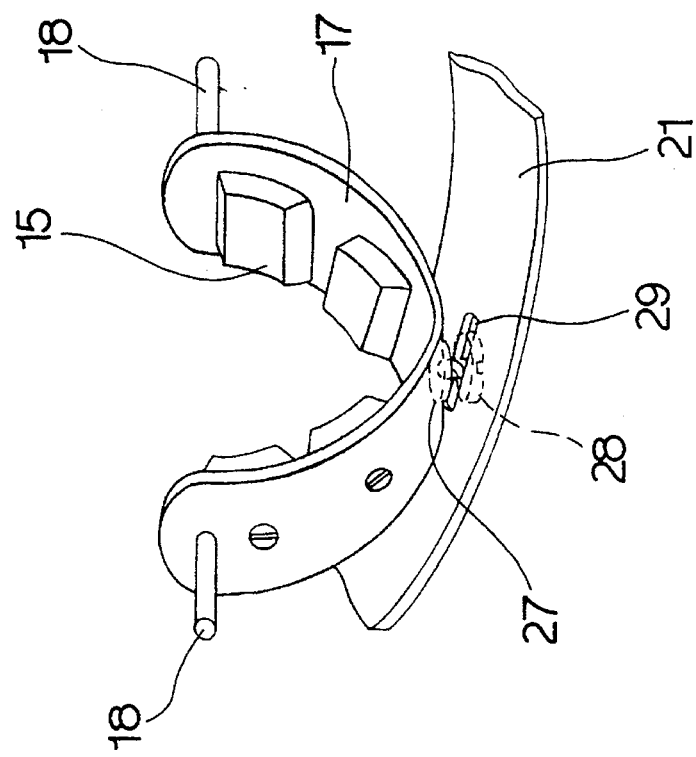

As generally known and as shown particularly in FIG. 3, each key 15 comprises a finger-piece or head 31 carried by a stem 32 having two contact parts 33, 33' spaced by a resilient insulator 34 and supported in a blind socket 35 by a compression spring 36 trapped between the underside of the head and the free end of the socket wall. Leads 37 extend from respective contact parts in conventional fashion.

Depression of the head 31 compresses the spring driving the stem against the base thereby pressing the contact parts into engagement to complete a circuit registering that key.

The lower side of the socket is formed with an undercut mounting groove 38 receiving a flange 39 of an adjustment screw 40 itself threadably received in the carrier 17 so that rotation of the screw 38 advances or withdraws the key unit towards and away from the user's fingers.

Thus, individual keys are readily adjustable both in height and laterally to accommodate hands of different sizes.

Figure 6:
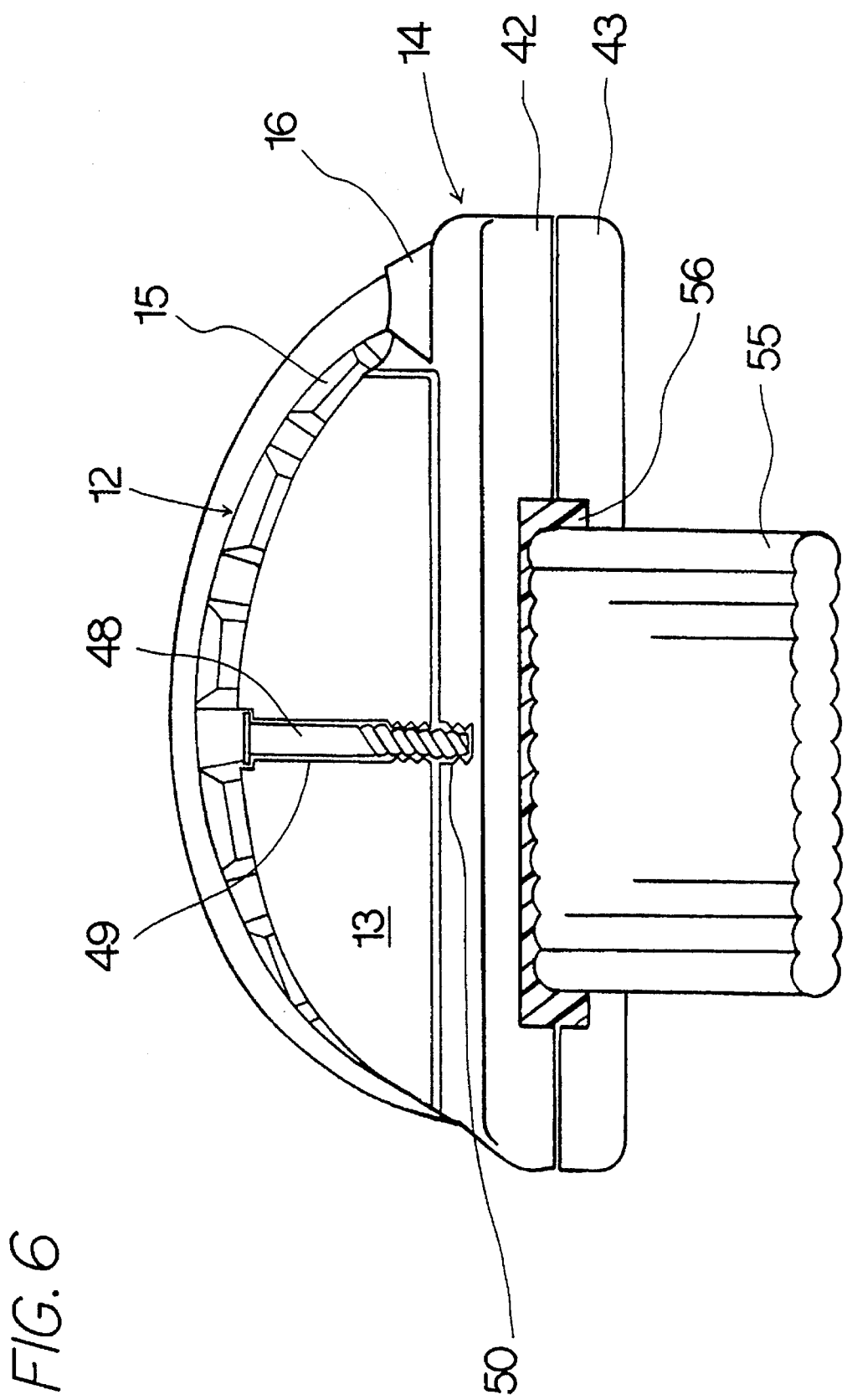
FIG. 6 is a rear view elevation of the keyboard unit of FIG. 2(a)
Figure 7:
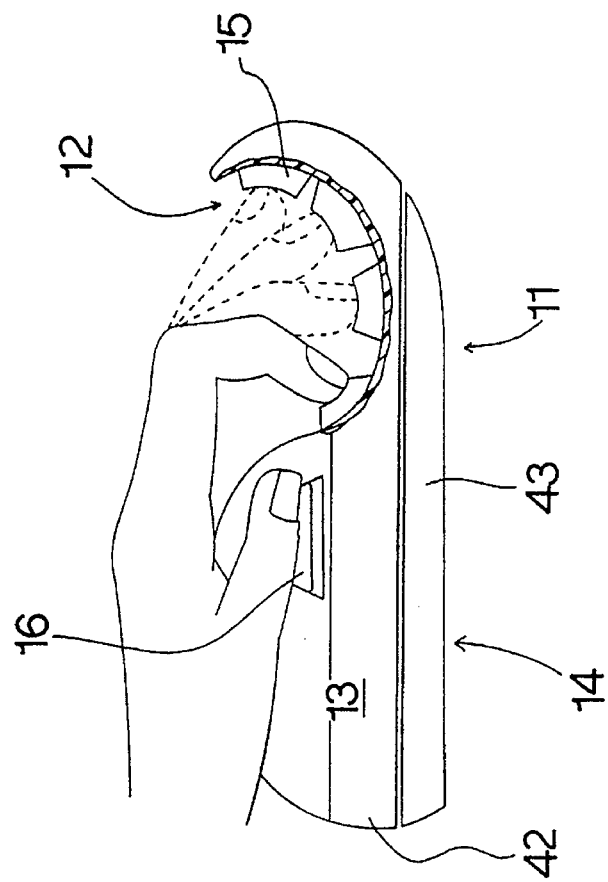
FIG. 7 is a schematic side elevation of the keyboard unit of FIG. 2(a) with background detail ommited, partly cut away to show the hand and finger positions of a typist in relation to a single row of keys.

As shown in FIGS. 3, 6 and 7, the casing 14 is a bipartite shell of reinforced plastic or other suitable material having upper and lower parts 42 and 43, respectively, secured together about the ribs by conventional means such as screws or integral spring latches (neither shown).

A further, thumb operated key 16 forming a space or enter bar is mounted on the casing extending through the upper casing part. Screw operated adjustment means (not shown) similar to that shown in FIG. 5 may be provided to raise or lower the key 16.

A handrest 13 formed as a dome-shaped palm support of suitable plastics is mounted for longitudinal sliding movement on the upper surface 47 (see FIG. 3) of the rear of the upper casing part 42 between several positions of adjustment by screw 48 (see FIGS. 3 and 6), inserted in a through-bore 49 in the handrest and receivable in a selected threaded aperture 50 or 50' of a series of locking apertures formed in the surface of the upper casing part. The apertures are joined by a longitudinally extending guide slot 52 forming a track which receives the tip of screw 48, when loosened, in longitudinal sliding engagement to guide the handrest during forward and rearward travel.

Figure 2B:
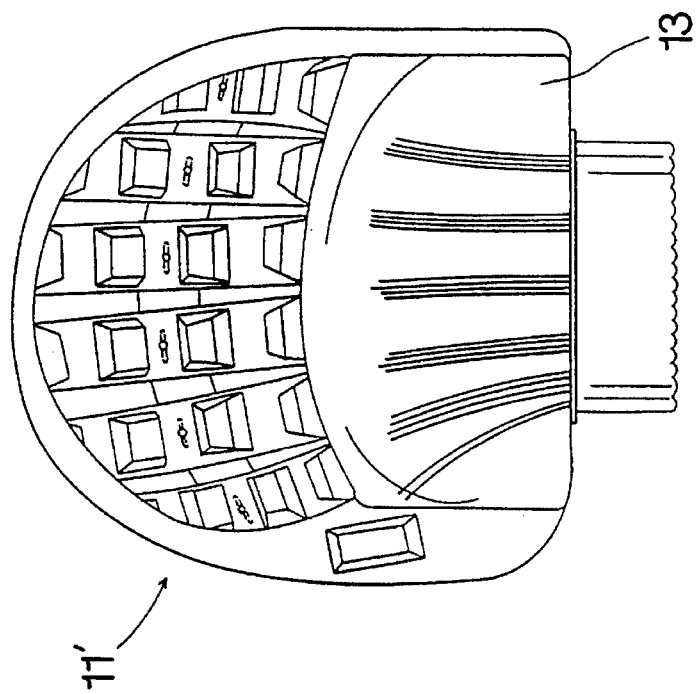
FIG. 2(b) is a similar view to FIG. 2(a) but at a reduced scale, showing a keyboard unit for operation by the right hand.

As shown in FIGS. 2(a), 2(b) and 6 leads extending to respective keys are brought together in a single flat or ribbon cable 55 secured to extend rearwardly from the unit by a suitable grommet structure 56.

As will be appreciated from viewing FIG. 7 in particular, the individual keys 15 of a row, as a result of their arcuate location, lie on substantially the path of the arcuate sweep of the fingertip of the user enabling the keys to be depressed without the user removing the palm of his hand from the supporting handrest. The laterally endmost, inwardly tilted keys are operated by a slight rocking movement of the typist's hand.

The keyboard units can be located spaced apart at different selected positions enabling a user to adopt and change any comfortable posture of his choosing, avoiding the strain arising from maintaining a rigid, stationary, often unnatural and unrelaxed position. Avoidance of stress and strain is aided by the provision of the handrest supporting the typists palm throughout typing. Furthermore, adjustment of the keys and handrest enables the units configuration to be matched to different hand sizes optimizing comfort and efficiency. In addition, the dome shape of the handset also assists in maintaining the profile of the hand in a suitably curved shape for maximizing key access.

The proximity of the fingertips to the keys may also enable higher touch typing speeds than when compared with a substantially flat or planar keyboard.

It will be appreciated that inversion of the screw within the slot formed in the carriers and the thread formed in the ribs would enable lateral adjustment without need to disassemble the casing while release and removal of the individual strip-like carriers (which may be stilly flexible or semi-rigid) from the ribs by completely withdrawing the screw would then permit also adjustment of the key height after release of the carriers.

The right hand unit shown in FIG. 2(b) is of similar construction to the left hand unit but essentially a mirror image thereof except that an additional row of keys for punctuation is provided.

In an alternative version the front and rear ribs may be formed with discrete flats at locations of attachment to the carriers, the flats on each rib then being in generally parallel relation to flats on the other ribs and formed with adjustment screw receiving slots similar to those provided on the medial rib extending parallel to slots in the medial rib, laterally of the unit to enable an entire carrier to be shifted laterally more easily, instead of merely pivoted and without need for flexural distortion of the ribs or carriers.

Furthermore, it will be appreciated that the ends of the carriers may themselves be formed to present downwardly convex surfaces to provide sufficient clearance to avoid interference with the curved rib parts during such pivotal movement, and the carriers together with the ribs may flex to accommodate such adjustment movement.

I claim:

1. A pair of keyboard units comprising housing frames carrying respective key pads with sets of keys having individual key designations serially arranged, respectively, in conformity with left hand and right hand operated sides of a QWERTY touch typing keyboard and handrests for supporting each hand during typing, means on each housing frame supporting the respective set of keys extending in front of and at a lower level than the handrest, means on each housing frame mounting the keys on the keypad for adjustment of their transverse positions relative to a typist's finger and comprising a series of transversely extending ribs and a series of longitudinally extending arcuate members carrying respective group of keys associated with the respective fingers and mounted for movement longitudinally of the transverse ribs to provide the transverse adjustment.

2. A pair of keyboard units according to claim 1 in which the key supporting means supports the respective set of keys in a concave array.

3. A pair of keyboard units according to claim 1 including means on each housing frame mounting the keys on the keypad for adjustment in a radial direction to and away from a typist's finger.

4. A pair of keyboard units according to claim 1 including means on each housing frame mounting the handrest for adjustment towards and away from the keypad.

5. A pair of keyboard units according to claim 1 in which the key supporting means supports the keys in a dished array curved about a transverse axis with a laterally outermost row of keys adjacent the user's index finger, tilted inwardly and curved about both a vertical axis and a longitudinal horizontal axis.

* * * * *